(12) United States Patent
Takushima et al.

(10) Patent No.: US 7,277,613 B2
(45) Date of Patent: Oct. 2, 2007

(54) OPTICAL MULTIPLEXER/DEMULTIPLEXER, OPTICAL COMMUNICATION SYSTEM AND METHOD OF MANUFACTURING THE OPTICAL MULTIPLEXER/DEMULTIPLEXER

(75) Inventors: Michiko Takushima, Yokohama (JP); Kenichiro Takahashi, Yokohama (JP); Akira Inoue, Yokohama (JP); Makoto Katayama, Yokohama (JP); Mitsuaki Tamura, Yokohama (JP)

(73) Assignee: Sumitomo Electric Indutries. Ltd., Oaska (JP)

( * ) Notice: Subject to any disclaimer, the term of this patent is extended or adjusted under 35 U.S.C. 154(b) by 127 days.

(21) Appl. No.: 11/197,749

(22) Filed: Aug. 5, 2005

(65) Prior Publication Data

US 2006/0029328 A1 Feb. 9, 2006

Related U.S. Application Data

(60) Provisional application No. 60/599,032, filed on Aug. 6, 2004.

(30) Foreign Application Priority Data

Aug. 5, 2004 (JP) ............................ P2004-229093
May 19, 2005 (JP) ............................ P2005-146960

(51) Int. Cl.
*G02B 6/42* (2006.01)

(52) U.S. Cl. .............................. 385/45; 385/14; 385/43
(58) Field of Classification Search .................... 385/45
See application file for complete search history.

(56) References Cited

U.S. PATENT DOCUMENTS

| 6,546,161 | B2* | 4/2003 | Okuno et al. ................. 385/14 |
| 6,760,510 | B2* | 7/2004 | Kimura ....................... 385/24 |
| 2004/0086221 | A1* | 5/2004 | Qiu et al. ..................... 385/24 |
| 2004/0126052 | A1* | 7/2004 | Kamei et al. ................. 385/14 |
| 2004/0223682 | A1* | 11/2004 | Ding et al. ................... 385/14 |
| 2004/0228573 | A1* | 11/2004 | Terakawa et al. ............. 385/24 |

OTHER PUBLICATIONS

M. Yanagisawa, et al., "Low-loss and compact TFF-embedded silica-waveguide WDM filter for video distribution services in FTTH systems," 2003, Tu14, Optical Society of America.

* cited by examiner

*Primary Examiner*—Frank G. Font
*Assistant Examiner*—Eric Wong
(74) *Attorney, Agent, or Firm*—McDermott Will & Emery LLP

(57) ABSTRACT

An optical multiplexer/demultiplexer is provided with a first member, a second member and an optical filter. The first member is a planar waveguide and is formed with an optical waveguide and another optical waveguide. The second member is a planar waveguide and is formed with an optical waveguide and another optical waveguide. The optical filter is a dielectric multi-layered filter and is sandwiched between the end face of the first member and the end face of the second member.

24 Claims, 11 Drawing Sheets

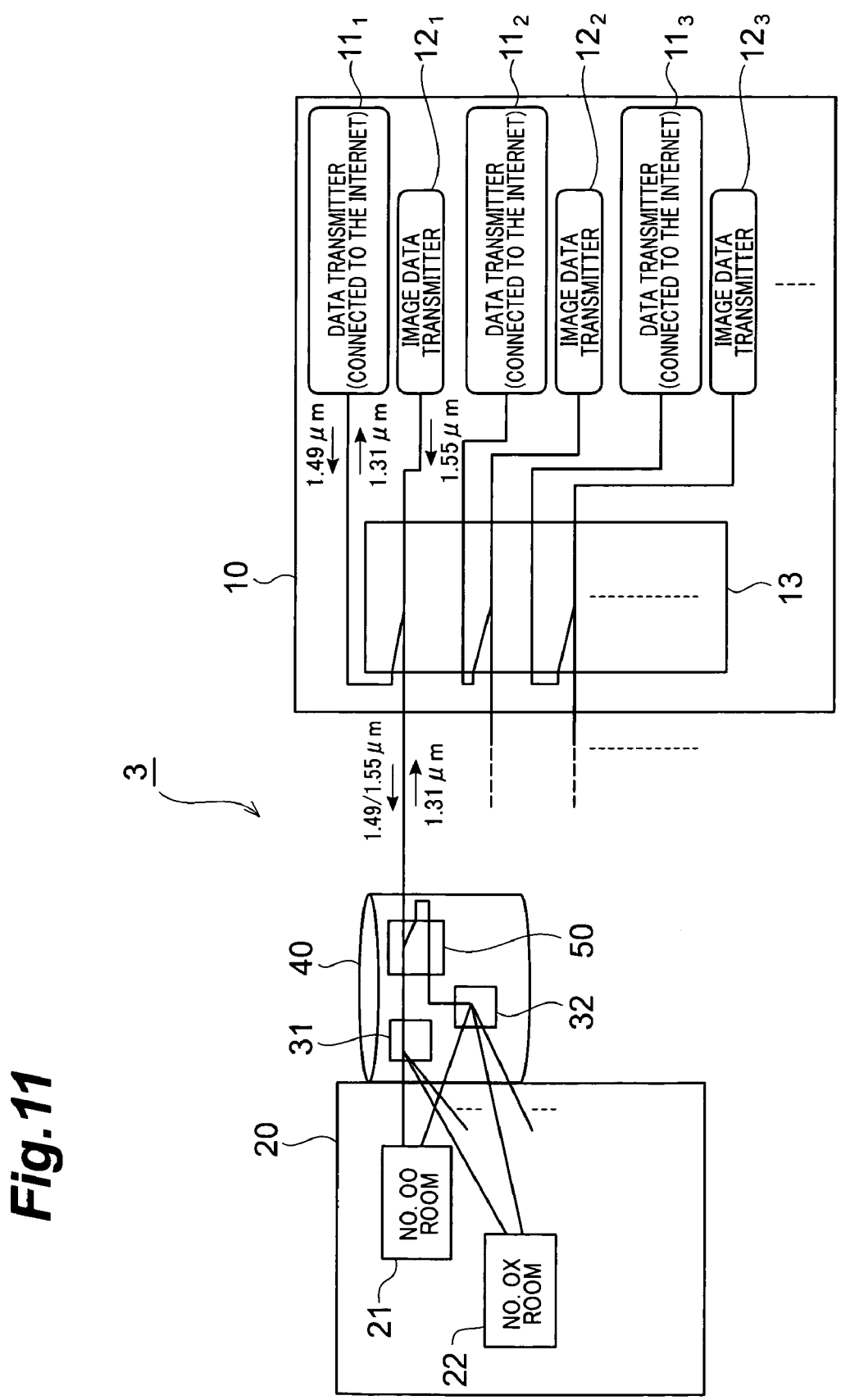

OPTICAL MULTIPLEXER/DEMULTIPLEXER, OPTICAL COMMUNICATION SYSTEM AND METHOD OF MANUFACTURING THE OPTICAL MULTIPLEXER/DEMULTIPLEXER

CROSS-REFERENCE TO RELATED APPLICATION

This application claims priority to Provisional Application Ser. No. 60/599,032 filed on Aug. 6, 2004 which is hereby incorporated by reference in its entirety.

BACKGROUND OF THE INVENTION

1. Field of the Invention

The present invention relates to an optical communication system for transmitting optical signals including a plurality of wavelengths, an optical multiplexer/demultiplexer used in such optical communication system or the like, and a method of manufacturing the optical multiplexer/demultiplexer.

2. Related Background of the Invention

In an optical communication system, which transmits optical signals including a plurality of wavelengths, an optical multiplexer/demultiplexer for multiplexing or demultiplexing these optical signals including the plurality of wavelengths is used. Particularly, in an optical communication system (FTTH: fiber to the home) between end office and subscriber's home, the optical multiplexer/demultiplexer is required to be small in size and moderate in price. In an optical multiplexer/demultiplexer disclose in M. Yanagisawa, et al., "Low-loss and compact TFF-embedded silica-waveguide WDM filter for video distribution services in FTTH systems" OFC 2004, TuI 4, for example, two optical waveguides are formed so as to cross with each other on a member, a V-groove is formed so as to go through the cross section thereof and an optical filter is inserted in the V-groove and fixed therein with an adhesive agent. In the optical multiplexer/demultiplexer, among light components guided through one optical waveguide and reached to the V-groove, a light component of a certain wavelength is transmitted by the optical filter and is further guided through the one optical waveguide; and a light component of other wavelength is reflected by the optical filter, and guided through the other optical waveguide.

SUMMARY OF THE INVENTION

In the optical multiplexer/demultiplexer disclosed in the above document, the width of the V-groove formed on the member has to be larger than the width of the optical filter. Since the shape of cross section of the groove is V-shaped, a gap is generated between the end face of the optical waveguide at the V-groove side and the optical filter. Generally, this gap is filled with an adhesive having the refractive index substantially identical to the refractive index of the optical waveguide. However, the position and posture of the optical filter may be displaced from an optimum state. Also, the structure of the adhesive is different from the structure of the optical waveguide. Therefore, at multiplexing or demultiplexing the light components, the loss tends to become large. Further, the optical characteristics (refractive index etc) of the adhesive have a temperature-dependency, and the thickness of the adhesive becomes large. Therefore, there reside several problems in the points of temperature-dependency of the multiplexing/demultiplexing characteristics and the reliability of the multiplexer/demultiplexer.

The present invention has been proposed to solve the above problems. An object of the present invention is to provide an optical multiplexer/demultiplexer capable of reducing the loss and having superior characteristics, an optical communication system equipped with such optical multiplexer/demultiplexer, and a method of manufacturing such optical multiplexer/demultiplexer.

An optical multiplexer/demultiplexer in accordance with the present invention comprises a first member on which a first optical waveguide and a second optical waveguide are formed so as to reach to an end face of the first member; a second member on which a third optical waveguide is formed so as to reach to an end face of the second member; and an optical filter provided between the end face of the first member and the end face of the second member, wherein the optical filter allows, among light components included in light transmitted through the first optical waveguide and outputted from the end face of the first member, a light component, which has been transmitted by the optical filter, to enter into the third optical waveguide from the end face of the second member, and a light component which has been reflected by the optical filter to enter into the second optical waveguide from the end face of the first member, or the optical filter allows, among light components included in light transmitted through the third optical waveguide and outputted from the end face of the second member, a light component, which has been transmitted by the optical filter, to enter into the first optical waveguide from the end face of the first member, and among light components included in light transmitted through the second optical waveguide and outputted from the end face of the first member, a light component which has been reflected by the optical filter to enter into the first optical waveguide from the end face of the first member.

The optical multiplexer/demultiplexer has such a structure that the optical filter is sandwiched between the first member and the second member which are prepared individually. Therefore, in the optical multiplexer/demultiplexer, the distance between the end face of the first member and the optical filter and the distance between the end face of the second member and the optical filter can be reduced, respectively. Accordingly, the position and the posture of the optical filter can be set to an optimum state. Further, the loss at multiplexing/demultiplexing the light components can be reduced. Furthermore, in the case where the optical filter is fixed with an adhesive, the thickness of the adhesive can be thin. Thus, the optical multiplexer/demultiplexer is superior in the points of temperature-dependency of the multiplexing/demultiplexing characteristics and the reliability thereof.

In the optical multiplexer/demultiplexer in accordance with the present invention; the followings are preferred. That is, the first member is a planar waveguide; the second member is a planar waveguide; or, the second member is optical fibers or an optical fiber array. Here, the mode field diameter of the planar waveguide is preferable to be enlarged at the end face; the mode field diameter of the optical fiber or each optical fiber included in the optical fiber array as the second member is preferable to be enlarged at the end face; and, the optical filter is preferable to be a dielectric multi-layered filter.

In the optical multiplexer/demultiplexer in accordance with the present invention, preferably, the optical axis of the first optical waveguide at the end face of the first member and the optical axis of the third optical waveguide at the end face of the second member do not align on the identical straight line. In other words, the respective optical waveguides are arranged so that the optimum optical connection is obtained between the first optical waveguide on the first member and the third optical waveguide on the second member. Since the first member and the second member composing the optical multiplexer/demultiplexer are prepared individually, the optical axes of the optical waveguides can be easily optimized.

In the optical multiplexer/demultiplexer in accordance with the present invention, preferably, the optical filter is formed being deposited on the end face of the first member or on the end face of the second member; or, the optical filter is fixed on the end face of the first member or on the end face of the second member with an adhesive.

In the optical multiplexer/demultiplexer in accordance with the present invention, preferably, a plurality of sets each of which includes the first optical waveguide, the second optical waveguide, the third optical waveguide and the optical filter is provided. In this configuration, the optical waveguides included in the same side with respect to the optical filters are preferably formed on the identical member. Preferably, the optical filters are formed integrally for the plurality of sets. Preferably, the optical axes of the optical waveguides on the identical side with respect to the optical filter are parallel to each other in the vicinity of the end face of the member different from the end face of the member opposite to the optical filter.

In the optical multiplexer/demultiplexer in accordance with the present invention, preferably, the first optical waveguide or the second optical waveguide is formed straightly in the first member. In this configuration, preferably, the plan shape of the first member is a rectangular shape having a first edge facing to the optical filter, a second edge on the side opposite to the first edge, and mutually parallel third and fourth edges, and to the optical waveguide formed straightly out of the first optical waveguide and the second optical waveguide, each of the third edge and the fourth edge is parallel and the second edge is perpendicular. Alternatively, the shape of the flat surface of the first member is a rectangular having a first edge facing the optical filter, a second edge on the side opposite to the first edge, and mutually parallel third and fourth edges, the third edge and the fourth edge are parallel to the optical waveguide formed straightly out of the first optical waveguide and the second optical waveguide, and the second edge is parallel to the first edge.

In the optical multiplexer/demultiplexer in accordance with the present invention, preferably, the end face of the first member and the end face of the second member are polished faces. Each of the end faces of the first member and the second member is preferably perpendicular to a face including the first waveguide, the second waveguide and the third waveguide. Each of the end faces of the first member and the second member is preferably perpendicular to a line, which bisects an angle formed by the first waveguide and the second waveguide. Each of the end faces of the first member and the second member is preferably in close contact with the optical filter.

An optical communication system in accordance with the present invention is an optical communication system for transmitting optical signals including a plurality of wavelengths, the system includes the optical multiplexer/demultiplexer defined in the above-described present invention, and the optical signals are multiplexed or demultiplexed by the optical multiplexer/demultiplexer. Further, in the case where the optical multiplexer/demultiplexer in which the first optical waveguide or the second optical waveguide is formed straightly on the first member is used, it is preferred that an optical signal of a first wavelength in the optical signals is guided in the straightly formed optical waveguide, and an optical signal of a second wavelength, which is shorter than the first wavelength in the plurality of wavelengths, is guided in the other optical waveguide.

An optical multiplexer/demultiplexer manufacturing method in accordance with the present invention is a method of manufacturing the optical multiplexer/demultiplexer in accordance with the present invention, which includes the steps of: preparing a first member on which a first optical waveguide and a second optical waveguide are formed so as to reach to an end face of the first member and a second member on which a third optical waveguide formed so as to reach to an end face of the second member; forming an optical filter on the end face of the first member or the end face of the second member by means of deposition; and fixing the first member and the second member while making the end face of the first member and the end face of the second member facing to each other. Alternatively, the optical filter is fixed to the end face of the first member or the second member with an adhesive and the first member and the second member are fixed while making the end face of the first member and the end face of the second member facing to each other Further, it is preferred that each of the end faces of the first member and the second member is polished before forming the optical filter on the end face of the first member or the second member by means of deposition, or before fixing the optical filter to the end face of the first member or the second member with an adhesive. Further, it is preferred that, when polishing each of the end faces of the first member and the second member, each of the end faces should be polished so that the polished faces are perpendicular to the face including the first waveguide, the second waveguide and the third waveguide. Further, it is preferred that, after polishing each of the end faces of the first member and the second member, the optical filter is sandwiched between the end face of the first member and the end face of the second member, and then the periphery thereof should be fixed with an adhesive.

BRIEF DESCRIPTION OF THE DRAWINGS

FIG. 11 is a diagram showing a configuration of the optical communication system 3 in accordance with the third embodiment.

DESCRIPTION OF THE PREFERRED EMBODIMENTS

Hereinafter, referring to the accompanying drawings, best embodiments for carrying out the present invention will be described in detail. In the explanations of the drawings, the identical elements will be given with the identical reference symbol, and redundant explanations therefor will be omitted.

Figure 1:
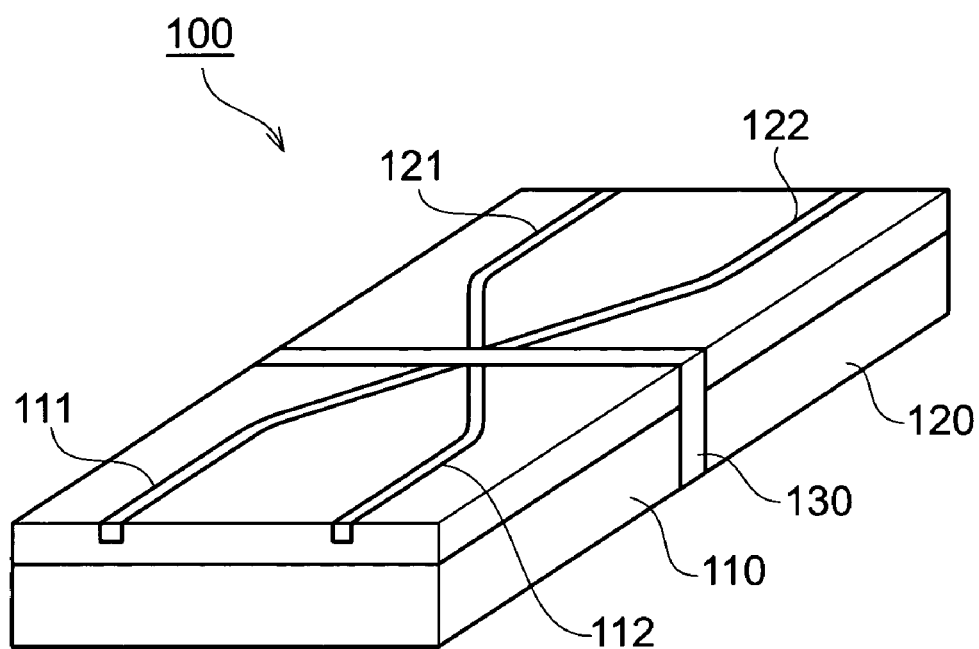
FIG. 1 is a perspective view of an optical multiplexer/demultiplexer 100 in accordance with a first embodiment.
Figure 2:
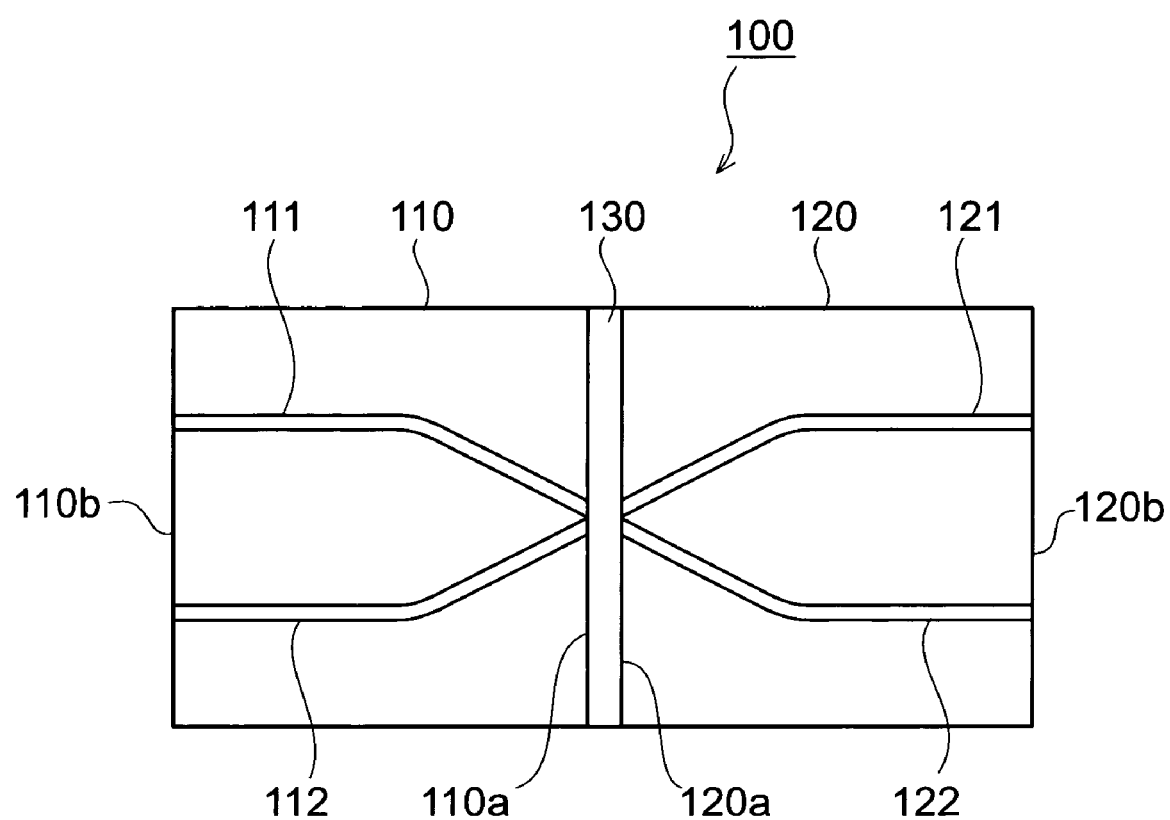
FIG. 2 is a plan view of the optical multiplexer/demultiplexer 100 in accordance with the first embodiment.

(First embodiment of the optical multiplexer/demultiplexer) First of all, a first embodiment of an optical multiplexer/demultiplexer in accordance with the present invention will be described. FIG. 1 is a perspective view of an optical multiplexer/demultiplexer 100 in accordance with the first embodiment. FIG. 2 is a plan view of the optical multiplexer/demultiplexer 100 in accordance with the first embodiment. The optical multiplexer/demultiplexer 100 shown in these figures includes a first member 110, a second member 120 and an optical filter 130.

The first member 110 is a planar waveguide in which an optical waveguide 111 and an optical waveguide 112 are formed. The second member 120 is a planar waveguide in which an optical waveguide 121 and an optical waveguide 122 are formed. Each of the first member 110 and the second member 120 is formed with a clad of quarts glass and a core of a quarts glass added with $GeO_2$ prepared, for example, on a member of a quarts glass or silicon. This core serves as the optical waveguide. Further, the optical filter 130 is a dielectric multi-layered filter, which is sandwiched between an end face 110a of the first member 110 and an end face 120a of the second member 120. Each of the optical waveguides 111 and 112 on the first member 110 is formed up to the end face 110a of the first member 110 on a side of the optical filter 130 so as to guide the light components between the end face 110a and the end face 110b on the opposite side. Each of the optical waveguides 121 and 122 on the second member 120 is formed up to the end face 120a of the second member 120 on another side of the optical filter 130 so as to guide the light components between the end face 120a and the end face 120b on the opposite side. At each of the end face 110b of the first member 110 and the end face 120b of the second member 120, each of the optical waveguides is preferable to be optically connected with an optical fiber or an optical fiber array.

The optical filter 130 is preferably formed being deposited on the end face 110a of the first member 110 or on the end face 120a of the second member 120. Alternatively, the optical filter 130 may be preferably prepared separately, and then, fixed by an adhesive. The optical filter 130 allows a light of a specific wavelength $\lambda_T$ to transmit; and on the other hand, reflects a light of other wavelength $\lambda_R$. For example, the transmission wavelength $\lambda_T$ is 1.55 μm; and the reflection wavelength $\lambda_R$ is 1.31 μm and 1.49 μm, but not limited thereto.

For example, among light components included in light which have been entered into the optical waveguide 111 from the end face 110b of the first member 110, guided through the optical waveguide 111 and outputted from the end face 110a, the optical filter 130 guides a light component of wavelength $\lambda_T$ transmitted by the optical filter 130 into the optical waveguide 122 from the end face 120a of the second member 120. And the optical filter 130 reflects and guides a light component of wavelength $\lambda_R$ from the end face 110a into the optical waveguide 112 of the first member 110. That is, in this case, the optical multiplexer/demultiplexer 100 can demultiplexes the light component of the wavelength $\lambda_T$ and the light component of wavelength $\lambda_R$.

Also, for example, the optical filter 130 allows the light component of wavelength $\lambda_T$, which has been guided through the optical waveguide 122 on the second member 120 and outputted from the end face 120a, to transmit and guide into the optical waveguide 111 from the end face 110a of the first member 110. Also, the optical filter 130 reflects the light component of wavelength $\lambda_R$, which has been guided through the optical waveguide 112 on the first member 110 and outputted from the end face 110a, and guides it into the optical waveguide 111 from the end face 110a of the first member 110. That is, the optical multiplexer/demultiplexer 100 can multiplexes the light component of wavelength $\lambda_T$ and the light component of wavelength $\lambda_R$.

Since each of the first member 110 and the second member 120 is formed with two optical waveguides, the optical multiplexer/demultiplexer 100 can be applied in various modes. However, one member may be formed with only one optical waveguide.

Different from the configuration disclosed in the non-patent document 1, in which a V-groove is formed on one member formed with two optical waveguides crossing each other and an optical filter is inserted in the V-groove, the optical multiplexer/demultiplexer 100 has such a structure that the optical filter 130 is sandwiched between the first member 110 and the second member 120, which are separately prepared. Therefore, in the optical multiplexer/demultiplexer 100, the distance between the end face 110a of the first member 110 and the optical filter 130 and the distance between the end face 120a of the second member 120 and the optical filter 130 can be made smaller respectively. Accordingly, the position and posture of the optical filter 130 can be set to an optimum state. Further, the loss at multiplexing/demultiplexing the light components can be reduced. Furthermore, to fix the optical filter 130 with an adhesive, the adhesive can be made thinner. Therefore the optical multiplexer/demultiplexer 100 is superior in temperature-dependency and reliability of the multiplexing/demultiplexing characteristics.

Preferably, the distance between the end face 110a of the first member 110 and the optical filter 130 should be 3 μm or less; and preferably, the distance between the end face 210a of the second member 210 and the optical filter 130 should be 3 μm or less. Owing to this arrangement, the loss at multiplexing/demultiplexing light components is reduced.

Preferably, the mode field diameter of each of the optical waveguides 111 and 112 at the end face 110a and the mode field diameter of each of the optical waveguides 121 and 122 at the end face 120a should be larger than the mode field diameter of ordinary single mode optical fiber; for example, 20 μm or more. Thus, by forming the mode field diameter of the optical waveguides at the end faces 110a and 120a facing to the optical filter 130 to be larger, the influence of the diffraction at the optical filter 130 can be reduced, and thus, the loss at multiplexing/demultiplexing can be reduced accordingly. Practically, it is necessary to select an optimum value with respect to the mode field diameter of the optical waveguide at the end faces 110a and 120a by analyzing the beam propagation while taking into consideration the incident angle of the light component into the optical filter 130, the loss in the optical waveguide and the influence from the higher mode and the like.

Figure 3:
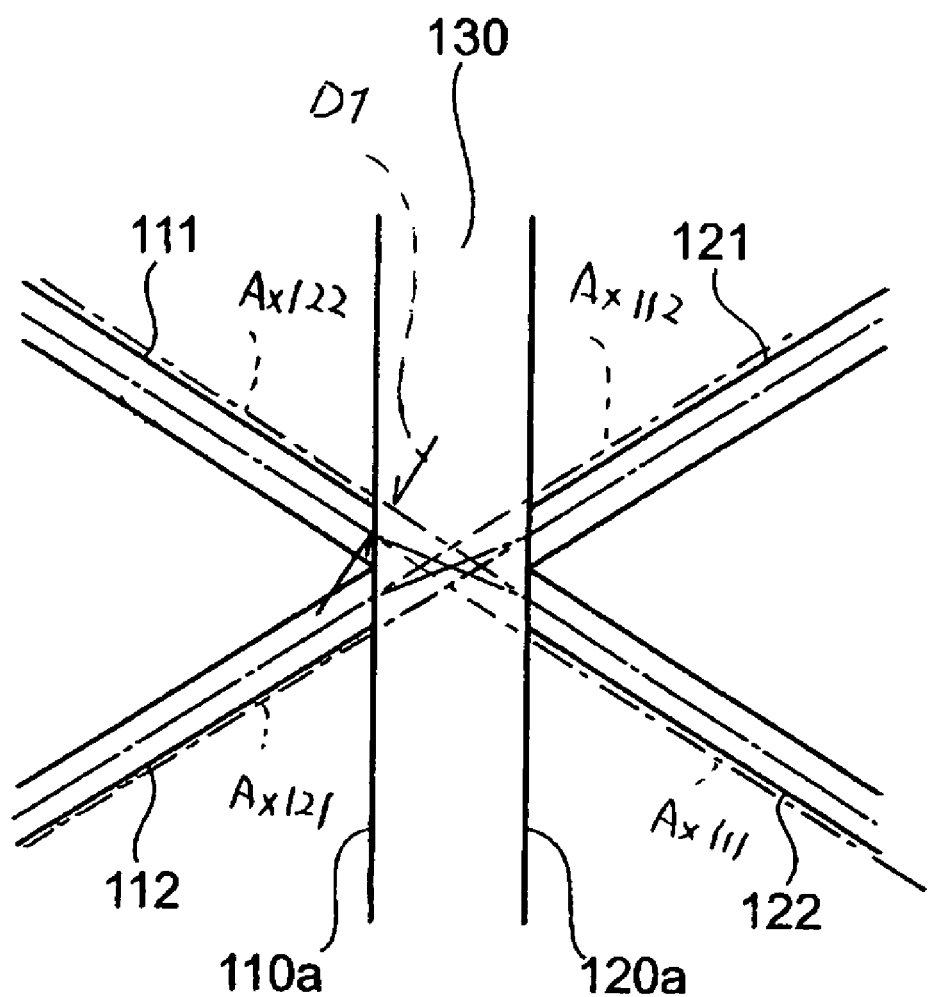
FIG. 3 is a partially enlarged view of the optical multiplexer/demultiplexer 100 in accordance with the first embodiment.

FIG. 3 is a partially enlarged view of the optical multiplexer/demultiplexer 100 in accordance with the first embodiment. In FIG. 3, the guide direction and the propagation direction of the light components are indicated with chain lines. As shown in FIG. 3, the optical axis of the optical waveguide 111 at the end face 110a of the first member 110 and the optical axis of the optical waveguide 122 at the end face 120a of the second member 120 are parallel to each other, but do not exist on the identical line. Also, the optical axis of the optical waveguide 112 at the end face 110a of the first member 110 and the optical axis of the optical waveguide 121 at the end face 120a of the second member 120 are parallel to each other, but do not exist on the identical line. In particular, each of the optical waveguides is formed so that the coupling of the transmitting light component of wavelength $\lambda_T$ between the optical waveguide 111 and the optical waveguide 122 and the coupling of the transmitting light component of wavelength $\lambda_T$ between optical waveguide 112 and the optical waveguide 121 are optimum by taking into consideration the refractive index of the optical waveguides 111, 112, 121 and 122 and the optical filter 130. Since the first member 110 and the second member 120 composing the optical multiplexer/demultiplexer 100 are prepared separately, the optical axes of the optical waveguides can be easily optimized as described above.

Figure 4:
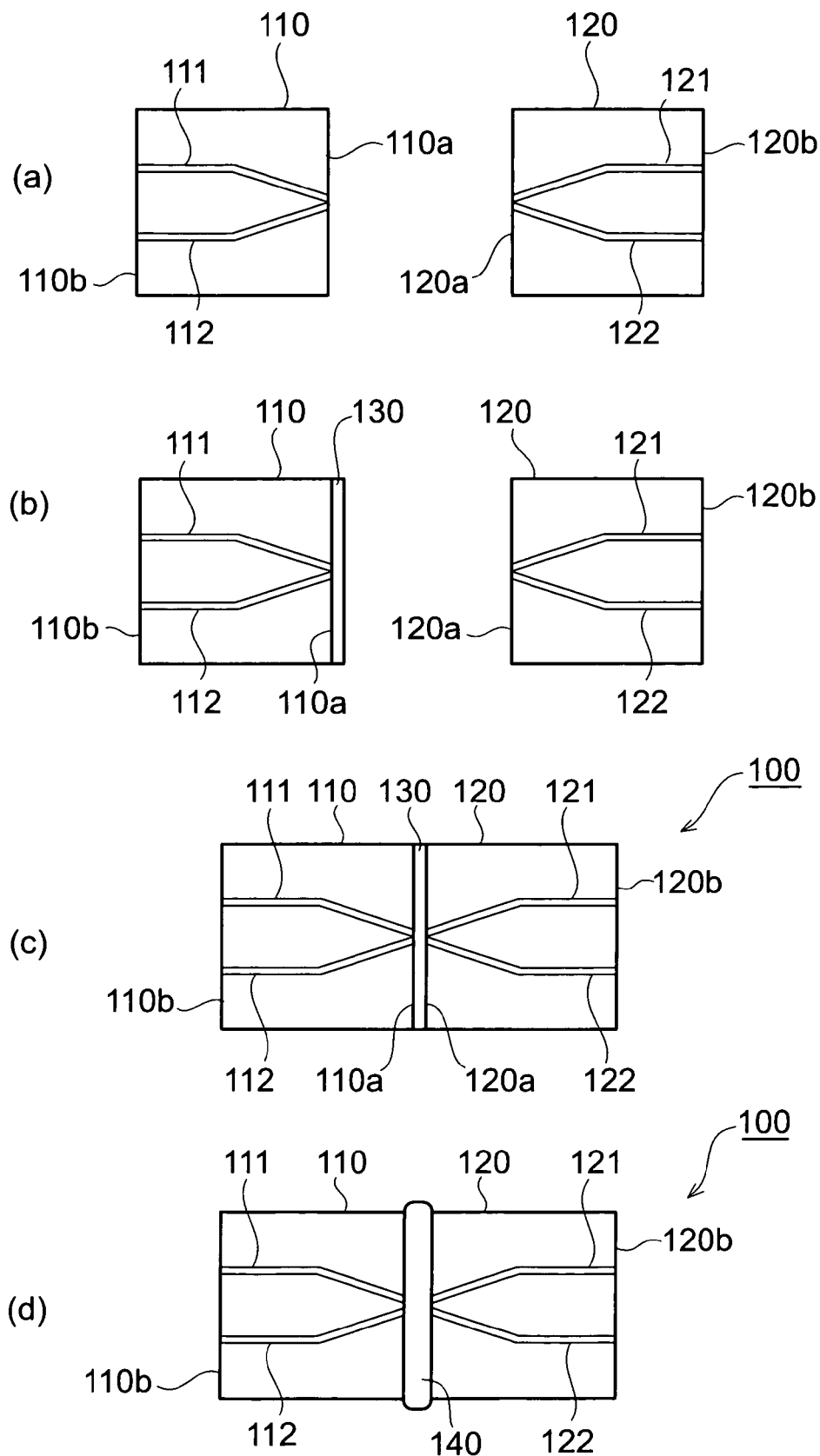
FIG. 4 is an illustration of a manufacturing method of the optical multiplexer/demultiplexer 100 in accordance with the first embodiment.

Next, the manufacturing method of the optical multiplexer/demultiplexer 100 will be described below. FIG. 4 illustrates the manufacturing method of the optical multiplexer/demultiplexer 100 in accordance with the first embodiment. First, the first member 110 and the second member 120 are prepared (FIG. 4(a)). Preferably, the end faces 110a and 110b of the first member 110 and the end faces 120a and 120b of the second member 120 should be polished. Then, the optical filter 130 is formed on the end face 110a of the first member 110 or on the end face 120a of the second member 120 by means of deposition. Or, the optical filter 130 prepared separately is fixed with an adhesive (FIG. 4(b)). And after aligning the cores to each other while facing the end face 110a of the first member 110 and the end face 120a of the second member 120, both are fixed to each other (FIGS. 4(c) and (d)).

As for the preparation method of the first member 110 and the second member 120, the following methods are available. That is, a method in which a part of a member previously formed with the optical waveguides is cut off so that the optical waveguide reaches to the end face and the end face of the cut off member is further polished; or, a method in which optical waveguides are previously formed so as not to reach to the end face is prepared, and then, the end face thereof is polished until the optical waveguide reaches to the end face.

Preferably, the polished face should be perpendicular to the face including the optical waveguides, and preferably, should be perpendicular to the line that bisects an angle formed by the first optical waveguide and the second optical waveguide. In the structure shown in FIG. 3, the angle between the normal of the end face 110a and the optical axis of the optical waveguide 111 and the angle between the normal of the end face 110a and the optical axis of the optical waveguide 112 is preferably equal to each other. Furthermore the angle between the normal of the end face 120a and the optical axis of the optical waveguide 121 and the angle between the normal of the end face 120a and the optical axis of the optical waveguide 122 is preferably equal to each other. Ordinarily, this angle is a designed incident angle with respect to the optical filter 130. In the case where only one optical waveguide is formed on any one of the first member 110 and the second member 120, the angle between the normal of the end face and the optical axis of the optical waveguide is the designed incident angle with respect to the optical filter 130. Preferably, the roughness of the polished face should be satisfactorily smaller than the wavelength; for example, the average roughness Ra with respect to the center line should be 10 nm or less. Owing to this, diffraction and dispersion of the light components at the end face is reduced; and thus, the return loss can be increased.

The optical filter 130 may be fixed to the end faces 110a and 120b by thinly applying an adhesive thereto or to the faces of the optical filter 130 (FIG. 4(c)). Or, after butting the end faces 110a, 120b and the optical filter 130, the periphery thereof may be fixed with the adhesive 140 (FIG. 4(d)). Or, they may be fixed using other method. For example, by using a frame box or a fixing jig, the first member 110, the second member 120 and the optical filter 130 may be fixed tie each other.

By the fixing method shown FIG. 4(d), the members 110, 120 and the optical filter 130 can be perfectly adhered to each other. In the fixing method shown FIG. 4(c), even when the flatness of the members 110 and 120 is poor, since the adhesive functions as a buffer, the optical filter 130 is prevented from being damaged. Further, in the fixing method shown in FIG. 4(c), the adhesive can be applied at several μm or less in thickness, and the end faces 110a and 120a and the optical filter 130 are substantially perfectly adhered to each other. The loss generated here can be reduced to a negligible level.

In the case where the adhesive is inserted between each of the first member 110 and second member 120 and the optical filter 130 as shown FIG. 4(c), preferably, the refractive index of the adhesive and the refractive index of the optical waveguide should be equal to each other. In the case where the difference of the refractive index between the adhesive and the optical waveguide is large, the reflection at the boundary therebetween deteriorates the characteristics of the device. Therefore, the structure shown in FIG. 4(d), in which each of the first member 110, the second member 120 and the optical filter 130 can be perfectly adhered, is preferred.

The optical multiplexer/demultiplexer 100 in accordance with the first embodiment as described above may be variously modified. Hereinafter, other embodiments of the modification will be described below as the examples.

Figure 5:
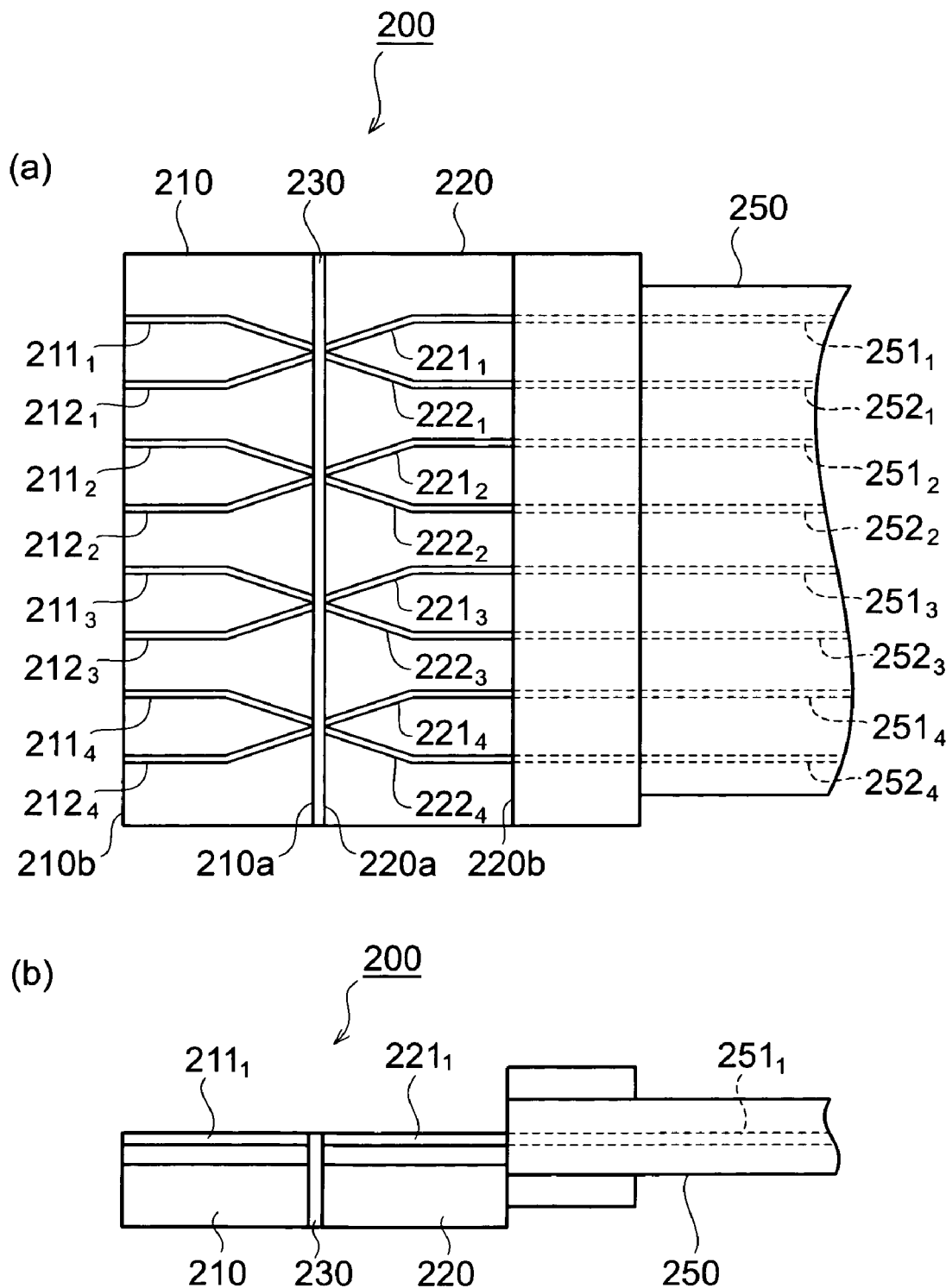
FIG. 5 is an illustration of a flat surface and a side surface of an optical multiplexer/demultiplexer 200 in accordance with a second embodiment.

(Second embodiment of the optical multiplexer/demultiplexer) Next, a second embodiment of the optical multiplexer/demultiplexer in accordance with the present invention will be described. FIG. 5 illustrates a flat surface and a side surface of an optical multiplexer/demultiplexer 200 in accordance with the second embodiment. FIG. 5(a) is a plan view of the optical multiplexer/demultiplexer 200; and FIG. 5(b) is a side view thereof. The optical multiplexer/demultiplexer 200 shown in FIG. 5 has a structure in which four sets of the optical multiplexer/demultiplexers 100 (FIG. 1, FIG. 2) are disposed in parallel. The optical multiplexer/demultiplexer 200 includes a first member 210, a second member 220 and an optical filter 230.

The first member 210 is a planar waveguide in which optical waveguides $211_1$ to $211_4$ and optical waveguides $212_1$ to $212_4$ are formed. The second member 220 is a planar waveguide in which the optical waveguides $221_1$ to $221_4$ and the optical waveguides $222_1$ to $222_4$ are formed. Each of the first member 210 and the second member 220 is formed with a clad of quarts glass and a core of a quarts glass added with $GeO_2$ on a member of, for example, a quarts glass or silicon. This core serves as the optical waveguide. Further, the optical filter 230 is a dielectric multi-layered filter, which is sandwiched between an end face 210a of the first member 210 and an end face 220a of the second member 220.

Each of the optical waveguides 211n and 212n on the first member 210 is formed up to the end face 210a of the first member 210 on a side of the optical filter 230 so as to guide light between the end face 210a and the end face 210b on the opposite side. Each of the optical waveguides 221n and 222n on the second member 220 is formed up to the end face 220a of the second member 220 on a side of the optical filter 230 so as to guide light between the end face 220a and the end face 220b on the opposite side. Here, the suffix "n" is an arbitrary integer of 1 to 4.

At the end face 220b of the second member 220, each of the optical waveguides is optically connected to the optical fiber array 250. That is, at the end face 220b, the optical waveguide 221n of the second member 220 is optically connected to the optical fiber core 251n of the optical fiber array 250; and the optical waveguide 222n of the second member 220 is optically connected to the optical fiber core 252n of the optical fiber array 250.

Preferably, the optical filter 230 should be deposited and formed on the end face 210a of the first member 210 or the end face 220a of the second member 220; or preferably, the optical filter 230 should be formed separately first, and then fixed thereto with an adhesive. The optical filter 230 allows light of a specific wavelength $\lambda_T$ to transmit, and reflects light of other wavelength $\lambda_R$.

In the optical multiplexer/demultiplexer 200, the optical waveguides 211n, 212n, 221n and 222n and the optical filter 230 in each set have the structure identical to that in the optical multiplexer/demultiplexer 100 (FIG. 1, FIG. 2) and operate likewise.

On a first member 210, eight optical waveguides $211_1$ to $211_4$ and $212_1$ to $212_4$ are formed; and on a second member 220, eight optical waveguides $221_1$ to $221_4$ and $222_1$ to $222_4$ are formed. Owing to this, the manufacturing cost per channel in each of the first member 210 and the second member 220 can be reduced. Also, although the optical filter 130 may be formed individually for each set, but preferably, the optical filter 130 should be formed integrally for four sets. In the later case, the optical multiplexer/demultiplexer 200 can be manufactured inexpensively.

Preferably, each of the optical axes of the eight optical waveguides $211_1$ to $211_4$ and $212_1$ to $212_4$ on the first member 210 should be parallel to each other at constant intervals in the end face 210b. And preferably, each of the optical axes of the eight optical waveguides $221_1$ to $221_4$ and $222_1$ to $222_4$ on the second member 220 should be parallel to each other at constant intervals in the end face 220b. In this case, the first member 210 and the second member 220 can be connected to the optical fiber array while aligning with each other.

Figure 6:
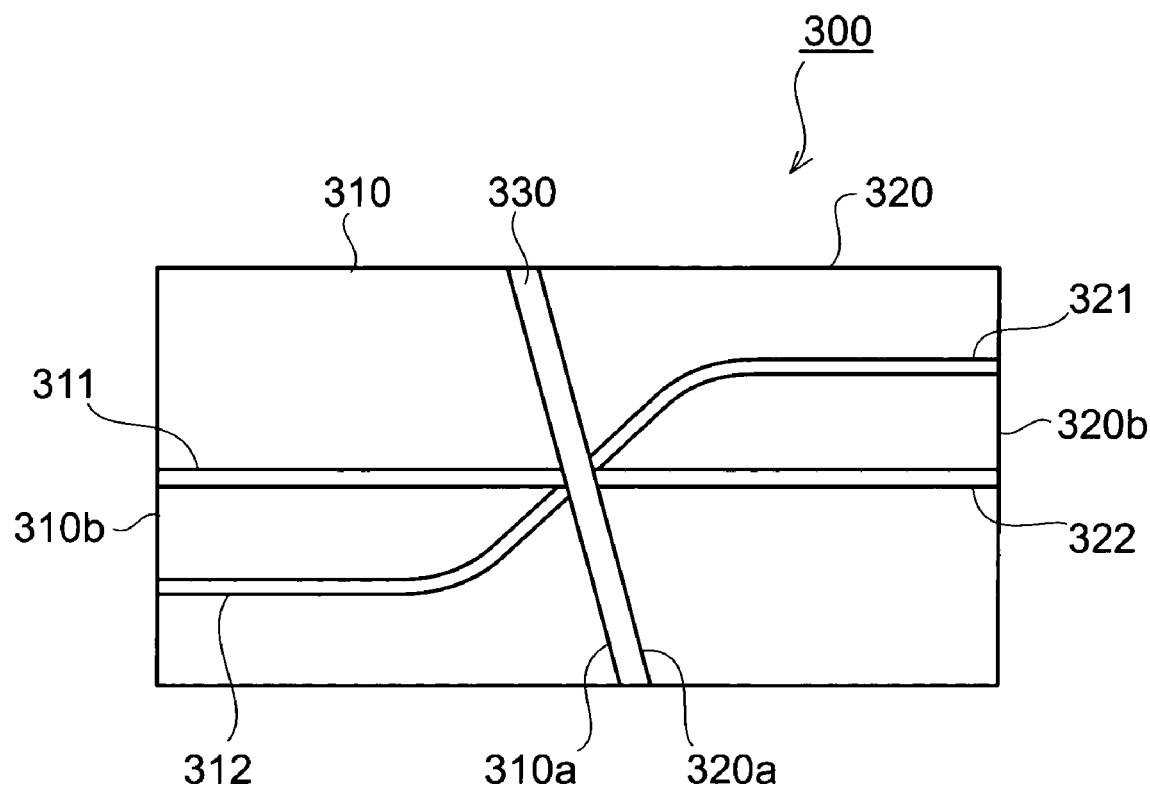
FIG. 6 is a plane view of an optical multiplexer/demultiplexer 300 in accordance with a third embodiment.

(Third embodiment of the optical multiplexer/demultiplexer) Next, a third embodiment of the optical multiplexer/demultiplexer in accordance with the present invention will be described. FIG. 6 is a plan view of an optical multiplexer/demultiplexer 300 in accordance with the third embodiment. The optical multiplexer/demultiplexer 300 shown in FIG. 6 includes a first member 310, a second member 320 and an optical filter 330.

The first member 310 is a planar waveguide in which an optical waveguide 311 and an optical waveguide 312 are formed. The second member 320 is a planar waveguide in which an optical waveguide 321 and an optical waveguide 322 are formed. Each of the first member 310 and the second member 320 is formed with a clad of quarts glass and a core of a quarts glass added with $GeO_2$ on a member of, for example, a quarts glass or silicon. This core serves as the optical waveguides. Further, the optical filter 330 is a dielectric multi-layered filter, which is sandwiched between an end face 310a of the first member 310 and an end face 320a of the second member 320.

Each of the optical waveguides 311 and 312 on the first member 310 is formed up to the end face 310a of the first member 310 on a side of the optical filter 330 so as to guide light between the end face 310a and the end face 310b on the opposite side. Each of the optical waveguides 321 and 322 on the second member 320 is formed up to the end face 320a of the second member 320 on a side of the optical filter 330 so as to guide light between the end face 320a and the end face 320b on the opposite side. In each of the end face 310b of the first member 310 and the end face 320b of the second member 320, preferably, each of the optical waveguides should be optically connected with an optical fiber or an optical fiber array.

Preferably, the optical filter 330 should be formed by means of deposition on the end face 310a of the first member 310 or on the end face 320a of the second member 320; or preferably, the optical filter 330 should be formed separately first, and then, fixed thereto with an adhesive. The optical filter 330 allows a light component of a specific wavelength $\lambda_T$ to transmit, and reflects another light component of wavelength $\lambda_R$. For example, the transmission wavelength $\lambda_T$ is 1.55 μm and the reflection wavelength $\lambda_R$ is 1.31 μm and 1.49 μm; but not limited thereto.

The optical multiplexer/demultiplexer 300 has the structure similar to that of the optical multiplexer/demultiplexer 100 (FIG. 1, FIG. 2) and operates likewise.

Generally, in the case where the optical waveguide has a curved shape, the guided light component having a longer wavelength causes the larger propagation loss. However, in the optical multiplexer/demultiplexer 300, the optical waveguide 311 on the first member 310 is formed straightly between the end face 310a and the end face 310b. Likewise, the optical waveguide 322 on the second member 320 is formed straightly between the end face 320a and the end face 320b. Therefore, when utilizing the optical multiplexer/demultiplexer 300, preferably, a light component of a longer wavelength should be guided into the straight optical waveguides 311 and 322; and a light component of a shorter wavelength should be guided into the optical waveguides 312 and 321 which have a curved portion respectively. Thus, the loss at multiplexing/demultiplexing the optical waves can be reduced.

The planar shape of the first member 310 is a rectangular shape, which has a first edge (the edge on the end face 310a side) facing to the optical filter 330, a second edge on the side opposite to the first edge (the edge on the end face 310b side) and mutually parallel third and fourth edges. Each of the third edge and the fourth edge is parallel to the straightly formed optical waveguide 311 and the second edge is perpendicular the optical waveguide 311. The first edge is not parallel to the second edge. In this case, since the straight optical waveguide 311 is perpendicular to the end face 310b, it is convenient when, for example, connecting the optical fiber and the optical waveguide 311. The situation is the same in the planar shape of the second member 320.

Figure 7:
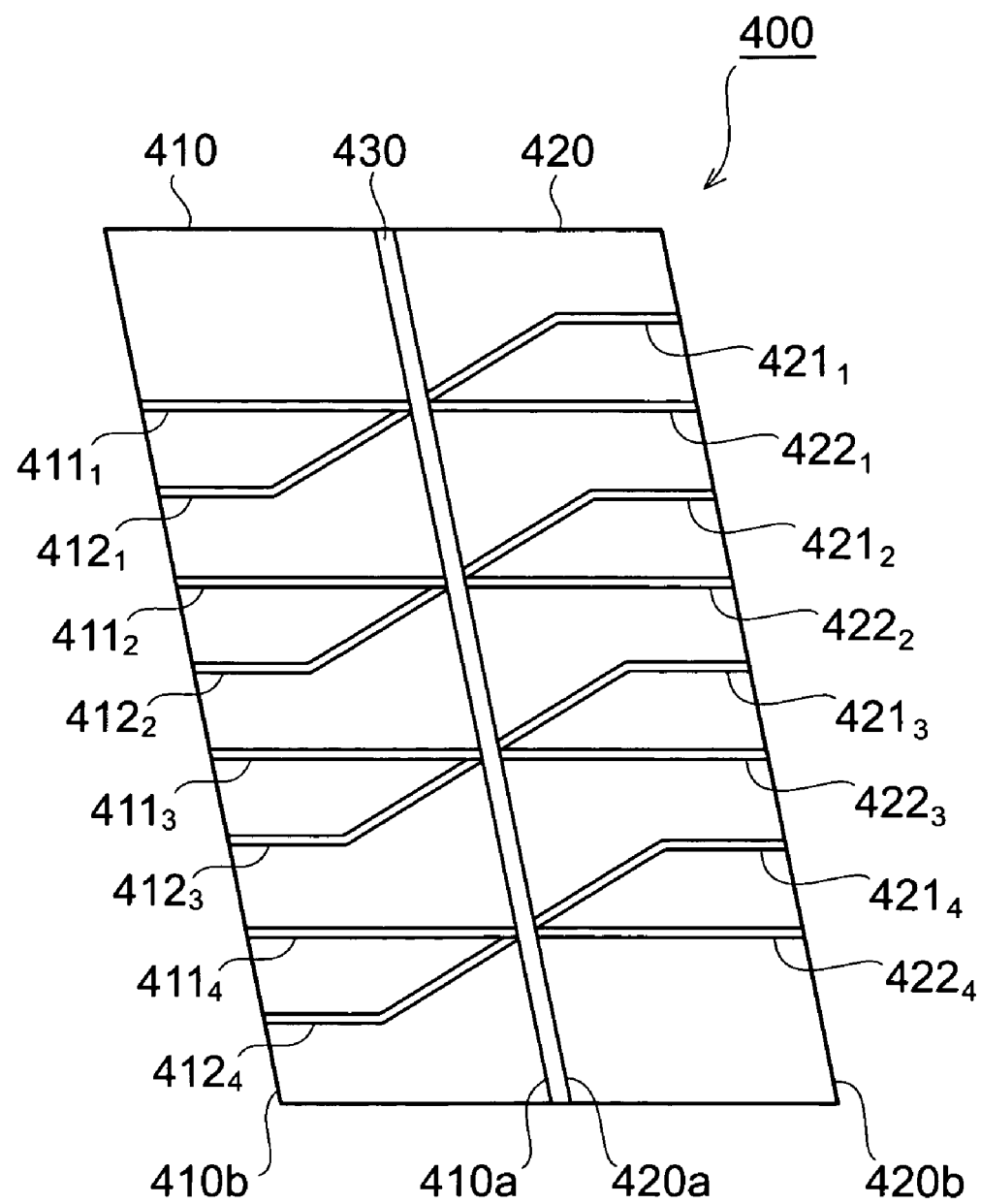
FIG. 7 is a plane view of an optical multiplexer/demultiplexer 400 in accordance with a fourth embodiment.

(Fourth embodiment of the optical multiplexer/demultiplexer) Next, a fourth embodiment of the optical multiplexer/demultiplexer in accordance the present invention will be described. FIG. 7 is a plan view of an optical multiplexer/demultiplexer 400 in accordance with the fourth embodiment. The optical multiplexer/demultiplexer 400 shown in FIG. 7 has a structure in which four sets of the optical multiplexer/demultiplexers are disposed in parallel. The optical multiplexer/demultiplexer 400 includes a first member 410, a second member 420 and an optical filter 430.

The first member 410 is a planar waveguide in which optical waveguides $411_1$ to $411_4$ and optical waveguides $412_1$ to $412_4$ are formed. The second member 420 is a planar waveguide in which the optical waveguides $421_1$ to $421_4$ and the optical waveguides $422_1$ to $422_4$ are formed. Each of the first member 410 and the second member 420 is formed with a clad of quarts glass and a core of a quarts glass added with $GeO_2$ on a member of, for example, a quarts glass or silicon. This core serves as the optical waveguide. Further, the optical filter 430 is a dielectric multi-layered filter, which is sandwiched between an end face 410a of the first member 410 and an end face 420a of the second member 420.

The optical waveguides 411n and 412n on the first member 410 are formed up to the end face 410a of the first member 410 on the optical filter 430 side so as to guide light between the end face 410a and the side end face 410b at the opposite thereof. The optical waveguides 421n and 422n on the second member 420 are formed up to the end face 420a of the second member 420 on the optical filter 430 side so as to guide light between the end face 420a and the side end face 420b at the opposite thereof. Here, the suffix "n" is an arbitrary integer of 1 to 4.

In the end face 410b of the first member 410, preferably, each of the optical waveguides should be optically connected to the optical fiber array. Also, in the end face 420b of the second member 420, preferably, each of the optical waveguides should be optically connected to the optical fiber array.

Preferably, the optical filter 430 should be formed by means of deposition on the end face 410a of the first member 410 or the end face 420a of the second member 420; or preferably, the optical filter 430 should be formed separately first, and then fixed thereto with an adhesive. The optical filter 430 allows a light component of a specific wavelength $\lambda_T$ to transmit, and reflects a light component of other wavelength $\lambda_R$.

In the optical multiplexer/demultiplexer 400, the optical waveguides 411n, 412n, 421n and 422n and the optical filter 430 in each set have the structure similar to that in the optical multiplexer/demultiplexer 300 and operate likewise.

The planar shape of the first member 410 is a rectangular shape, which has a first edge (the edge on the end face 410a side) facing to the optical filter 430, a second edge on the side opposite to the first edge (the edge on the end face 410b side) and mutually parallel third and fourth edges. Each of the third edge and the fourth edge is parallel to the straightly formed optical waveguide 411. The second edge is parallel to the first edge. In this case, since the waveguide length of the respective optical waveguides $411_1$ to $411_4$ can be set constant to a specific value, and the waveguide length of the respective optical waveguides $411_1$ to $411_4$ can be also set constant to a specific value. The planar shape of the second member 420 is the same as that of the above. Accordingly, the loss in each of the four sets at multiplexing/demultiplexing the light components can be set constant to a specific value.

Figure 8:
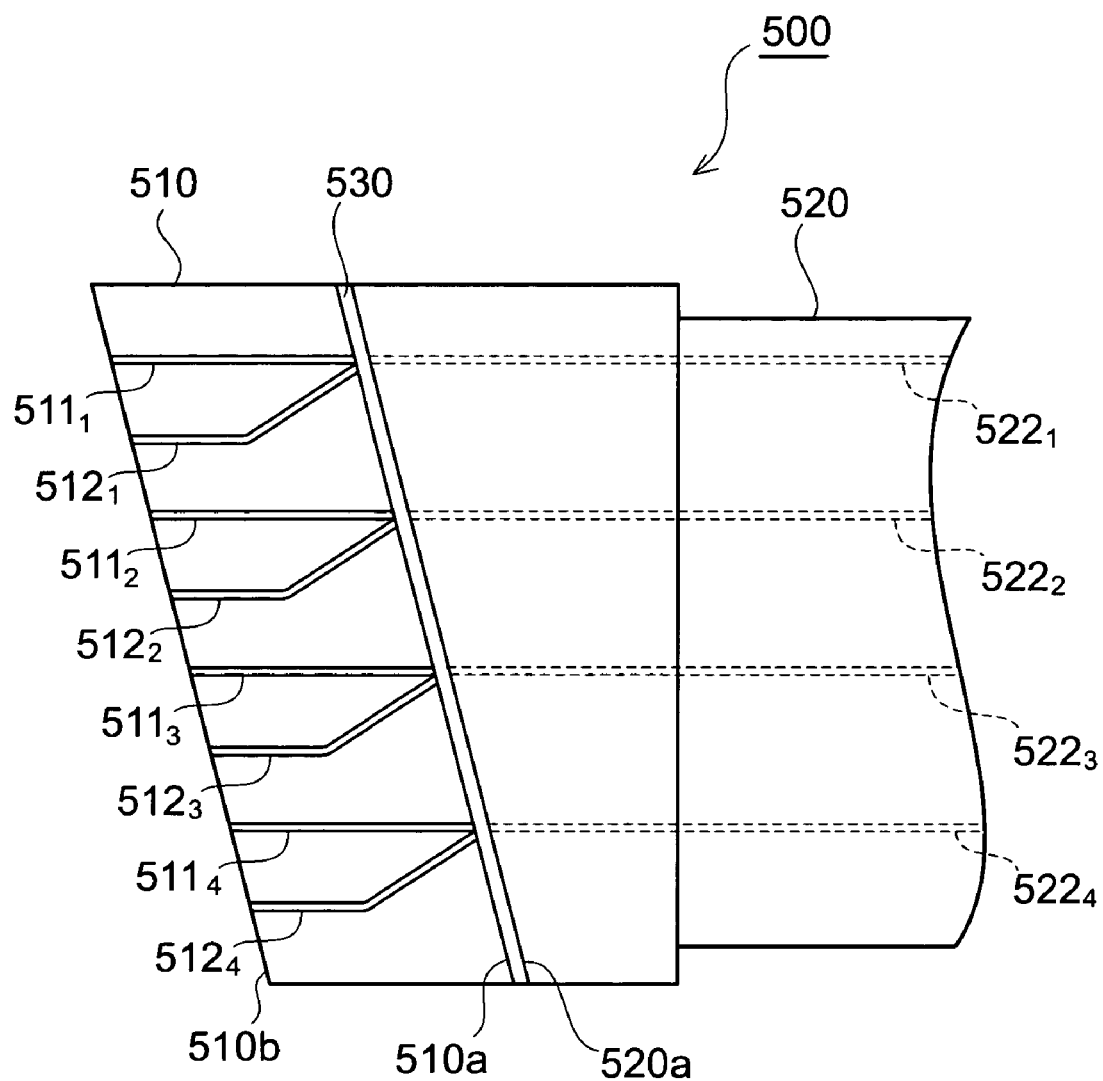
FIG. 8 is a plane view of an optical multiplexer/demultiplexer 500 in accordance with a fifth embodiment.

(Fifth embodiment of the optical multiplexer/demultiplexer) Next, a fifth embodiment of the optical multiplexer/demultiplexer in accordance the present invention will be described. FIG. 8 is a plan view of an optical multiplexer/demultiplexer 500 in accordance with the fifth embodiment. The optical multiplexer/demultiplexer 500 shown in FIG. 8 has a structure in which four sets of the optical multiplexer/demultiplexers are disposed in parallel. The optical multiplexer/demultiplexer 500 includes a first member 510, an optical fiber array 520 as a second member and an optical filter 530.

The first member 510 is a planar waveguide in which optical waveguides $511_1$ to $511_4$ and optical waveguides $512_1$ to $512_4$ are formed. The first member 510 is formed with a clad of quarts glass and a core of a quarts glass added with $GeO_2$ on a member of, for example, a quarts glass or silicon. This core serves as the optical waveguide. The optical fiber array 520 as the second member is formed of the optical fiber core $522_1$ to $522_4$ disposed in parallel. Further, the optical filter 530 is a dielectric multi-layered filter, which is sandwiched between an end face 510a of the first member 510 and an end face 520a of the second member 520.

The optical waveguides 511n and 512n on the first member 510 are formed up to the end face 510a of the first member 510 on a side of the optical filter 530 so as to guide light between the end face 510a and the end face 510b on the opposite side thereof. The optical fiber core 522n on the optical fiber array 520 allow a light component which has been guided through the optical waveguide 511n on the first member 510 and transmitted by the optical filter 530 to enter into the end face and guide therethrough. Here, the suffix "n" is an arbitrary integer of 1 to 4.

In the end face 510b of the first member 510, preferably, each of the optical waveguides should be optically connected to the optical fiber array.

Preferably, the optical filter 530 should be formed by means of deposition on the end face 510a of the first member 510; or preferably, the optical filter 530 should be formed separately first, and then fixed thereto with an adhesive. The optical filter 530 allows a light component of a specific wavelength $\lambda_T$ to transmit, and reflects a light component of other wavelength $\lambda_R$.

The planar shape of the first member 510 in the optical multiplexer/demultiplexer 500 is the same as the planar shape of the first member 410 in the optical multiplexer/demultiplexer 400. In the optical multiplexer/demultiplexer 500, the optical waveguides 511n, 512n and 522n and optical filter 530 operate in the same manner as that of the optical multiplexer/demultiplexer 400.

Further, in the vicinity of the end face 520a, preferably, the dopants in each of the optical fiber cores 522n included in the optical fiber array 520 should be diffused, and then, the mode field diameter of each optical fiber should be enlarged. Owing to this, the loss at multiplexing/demultiplexing of the light components can be reduced.

Figure 9:
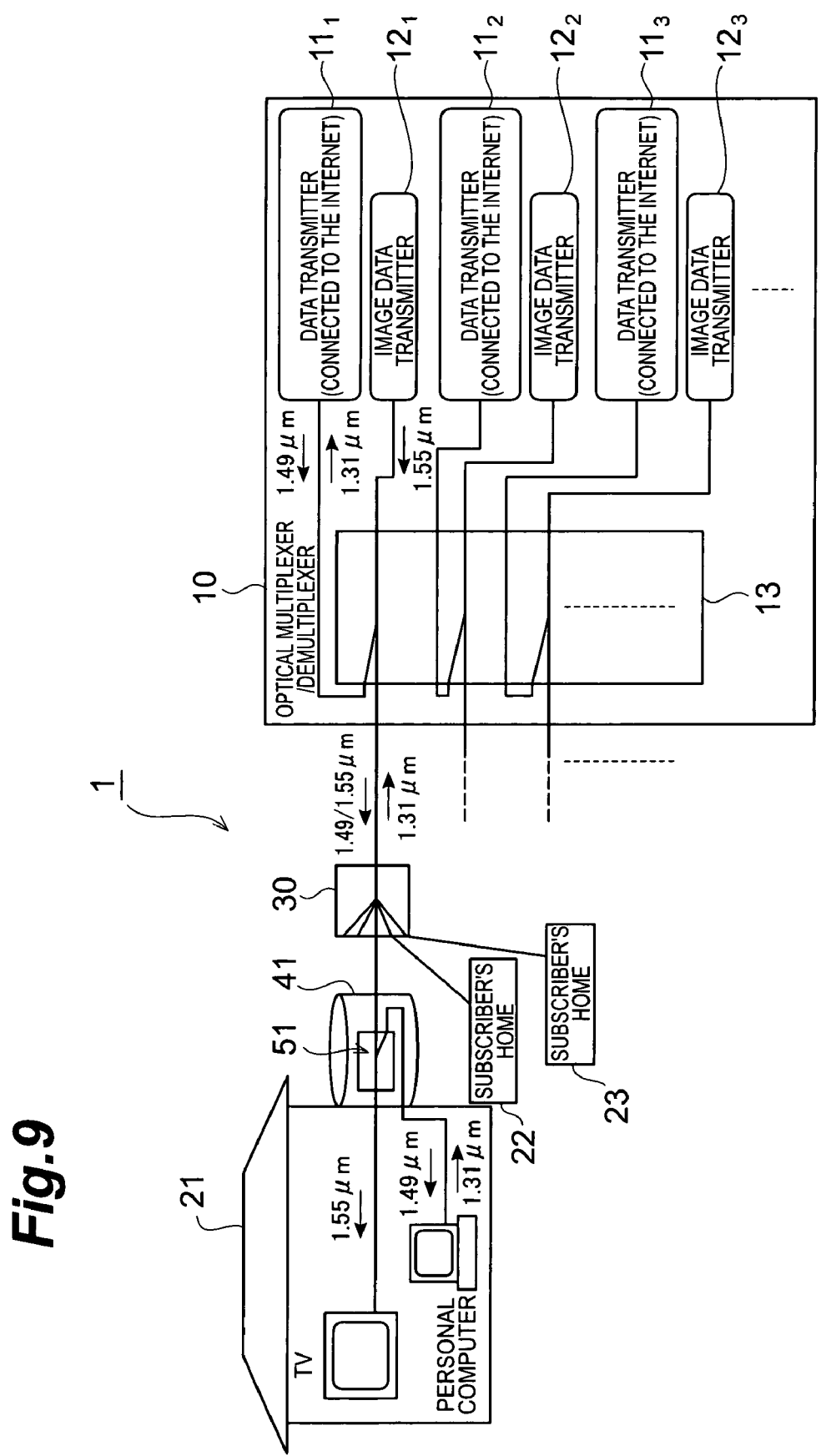
FIG. 9 is a diagram showing a configuration of the optical communication system 1 in accordance with the first embodiment.

(First embodiment of the optical communication system) Next, a first embodiment of an optical communication system in accordance with the present invention will be described. FIG. 9 is a diagram showing a configuration of an optical communication system 1 in accordance with the first embodiment. The optical communication system 1 shown in FIG. 9 is an FTTH (fiber to the home) system, which performs bidirectional transmission and reception of optical signals between a station 10 and subscriber's homes 21 to 23.

In the station 10, data transmitters $11_1$ to $11_3$, image data transmitters $12_1$ to $12_3$ and an optical multiplexer/demultiplexer 13 are provided. Each of the data transmitters $11_1$ to $11_3$ is connected to the Internet, and performs transmission and reception of digital data with the subscriber's homes 21 to 23. Each of the image data transmitters $12_1$ to $12_3$ transmits image signals (analogue data) to the subscriber's homes 21 to 23. The wavelength of the optical signals sent from the subscriber's homes 21 to 23 to the data transmitters $11_1$ to $11_3$ is 1.31 µm; the wavelength of the optical signals sent from the data transmitters $11_1$ to $11_3$ to the subscriber's homes 21 to 23 is 1.49 µm; and the wavelength of the optical signals sent from the image data transmitters $12_1$ to $12_3$ to the subscriber's homes 21 to 23 is 1.55 µm.

The optical multiplexer/demultiplexer 13 provided in the station 10 multiplexes and demultiplexes optical signals of 3 wavelengths transmitted and received by the data transmitters $11_1$ to $11_3$ and the image data transmitters $12_1$ to $12_3$. The optical multiplexer/demultiplexer according to the above-described embodiments is used for the optical multiplexer/demultiplexer 13. Particularly, the optical multiplexer/demultiplexers 200 400 and 500, in which plurality sets of optical multiplexer/demultiplexers are disposed in parallel, are preferably used.

In the subscriber's home 21, an optical receiver 41 is provided, and in the optical receiver 41, an optical multiplexer/demultiplexer 51 is provided. Other subscriber's homes 22 and 23 are also provided with optical receivers. Further, near the subscriber's homes 21 to 23, a star coupler 30 is provided. The star coupler 30 branches the optical signals (wavelength: 1.49 µm, 1.55 µm) transmitted from the station 10, and transmits the branched optical signals to the subscriber's homes 21 to 23 respectively. The star coupler 30 transmits the optical signals (wavelength: 1.33 µm) transmitted from the subscriber's homes 21 to 23 side to the station 10. The optical multiplexer/demultiplexer 51 multiplexes and demultiplexes optical signals of 3 wavelengths. The optical multiplexer/demultiplexers according to the above-described embodiment is used for the optical multiplexer/demultiplexer 51.

In the optical communication system 1, optical signals (wavelength: 1.49 µm, 1.55 µm), which are outputted from a data transmitter $11_n$ and an image data transmitter $12_n$ respectively are multiplexed by the optical multiplexer/demultiplexer 13 in the station 10 and transmitted therefrom. The optical signals transmitted from the station 10 are branched by the star coupler 30, the branched optical signals are demultiplexed by the optical multiplexer/demultiplexer 51 in the optical receiver 41. One demultiplexed optical signal (wavelength: 1.49 µm) is transmitted to a personal computer in the subscriber's home 21; and the other demultiplexed optical signal (wavelength: 1.55 µm) is transmitted to a TV receiver in the subscriber's home 21. An optical signal (wavelength: 1.33 µm) transmitted from the personal computer in the subscriber's home 21 is received by the data transmitter $11_n$ through the optical multiplexer/demultiplexer 51 and the star coupler 30 in the optical receiver 41 and the optical multiplexer/demultiplexer 13 in the station 10.

In this embodiment, as the optical multiplexer/demultiplexers 13 and 52, the optical multiplexer/demultiplexers of the above-described embodiments are used. Accordingly, a high quality optical signals can be transmitted with small loss at multiplexing and demultiplexing.

Figure 10:
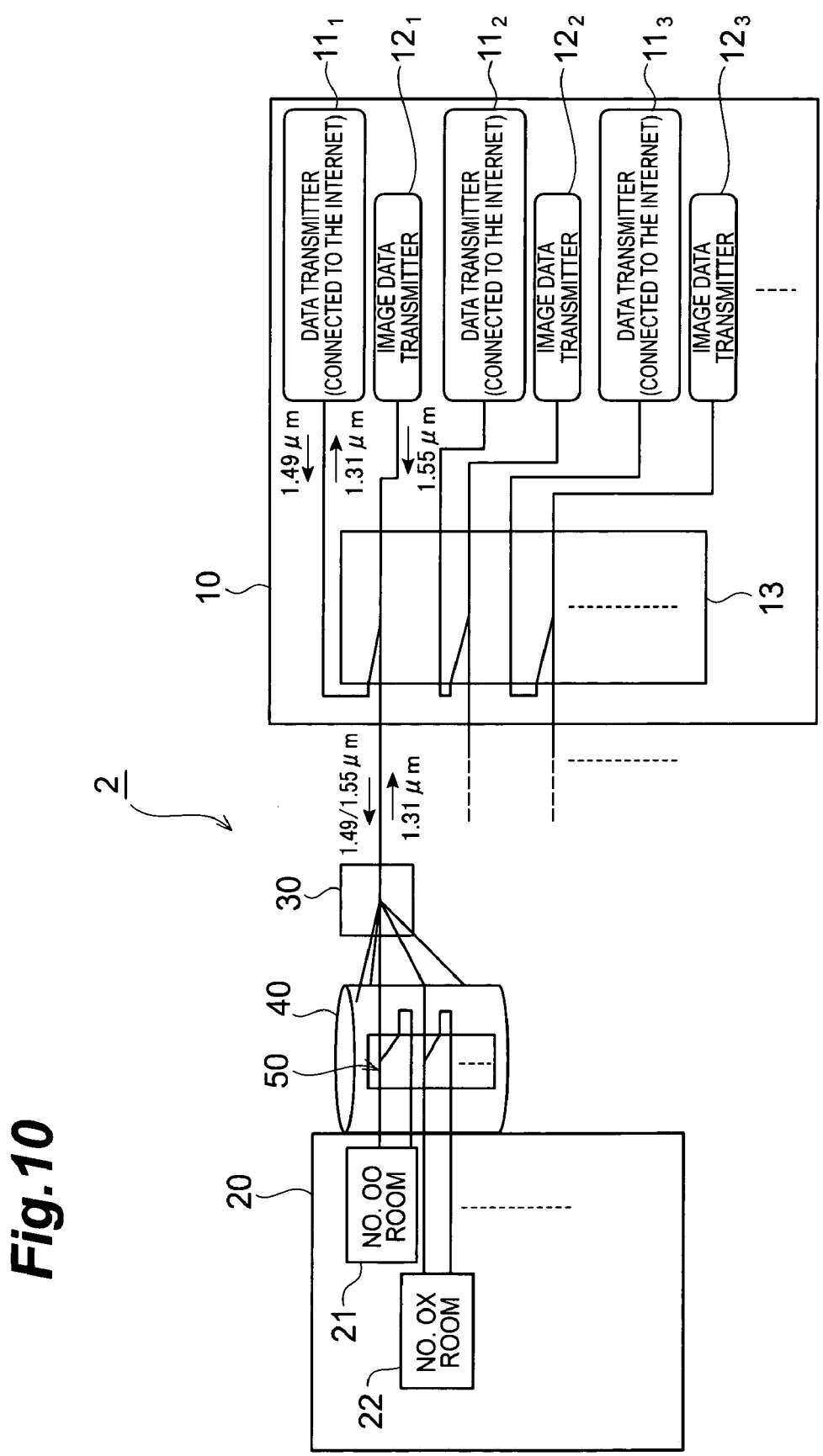
FIG. 10 is a diagram showing a configuration of the optical communication system 2 in accordance with the second embodiment.

(Second embodiment of the optical communication system) Next, a second embodiment of an optical communication system in accordance with the present invention will be described. FIG. 10 is a diagram showing an optical communication system 2 in accordance with the second embodiment. The optical communication system 2 shown in FIG. 10 is an FTTH system, which performs bidirectional transmission and reception of optical signals between a station 10 and subscriber's homes 21, and 22 in a mansion 20. Compared to the optical communication system 1 (FIG. 9) in accordance with the first embodiment, the optical communication system 2 in accordance with the second embodiment is different in the following two points. That is, subscriber's homes 21 and 22 are collective housings in the mansion 20, and one optical receiver 40 is provided for the mansion 20.

In the optical receiver 40 provided in the mansion 20, an optical multiplexer/demultiplexer 50 is provided. The optical multiplexer/demultiplexer 50 multiplexes and demultiplexes optical signals of 3 wavelengths. The optical multiplexer/demultiplexers of the above-described embodiments are applicable to the optical multiplexer/demultiplexer 50. Particularly, the optical multiplexer/demultiplexers 200, 400, and 500, in which plural sets of optical multiplexer/demultiplexers are disposed in parallel, are preferably applicable to the optical multiplexer/demultiplexer 50. The star coupler 30 may be provided in the optical receiver 40.

In the optical communication system 2, optical signals (wavelength: 1.49 µm, 1.55 µm) outputted from the data transmitter $11_n$ and the image data transmitter 12, respectively are multiplexed by the optical multiplexer/demultiplexer 13 in the station 10 and transmitted therefrom. The optical signals transmitted from the station 10 are branched by the star coupler 30, and the branched optical signals are demultiplexed by the optical multiplexer/demultiplexer 50 in the optical receiver 40. One demultiplexed optical signal (wavelength: 1.49 µm) is transmitted to personal computers in each subscriber's home; and the other optical signal (wavelength: 1.55 µm) is transmitted to TV receivers in each subscriber's home. An optical signal (wavelength: 1.33 µm) transmitted from a personal computer in each subscriber's home is received by the data transmitter $11_n$ through the optical multiplexer/demultiplexer 50 in the optical receiver 40, the star coupler 30 and the optical multiplexer/demultiplexer 13 in the station 10.

(Third embodiment of the optical communication system) Next, a third embodiment of an optical communication system in accordance with the present invention will be described. FIG. 11 is a diagram showing an optical communication system 3 in accordance with the third embodiment. The optical communication system 3 shown in FIG. 11 is an FTTH system, which performs bidirectional transmission and reception of optical signals between a station 10 and subscriber's homes 21, and 22 in a mansion 20. Compared to the optical communication system 2 (FIG. 10) in accordance with the second embodiment, the optical communication system 3 in accordance with the third embodiment is different in the following point. That is, the optical communication system 3 in accordance with the third embodiment is provided with star couplers 31 and 32 and an optical multiplexer/demultiplexer 50 in an optical receiver 40.

In this optical communication system 3, optical signals (wavelength: 1.49 µm, 1.55 µm) outputted from the data transmitter $11_n$ and image data transmitter $12_n$ respectively are multiplexed by the optical multiplexer/demultiplexer 13 in the station 10 and transmitted therefrom. The optical signals transmitted from the station 10 are demultiplexed by the optical multiplexer/demultiplexer 50 in the optical receiver 40. One optical signal (wavelength: 1.49 µm) demultiplexed by the optical multiplexer/demultiplexer 50 is branched by the star coupler 31 and transmitted to personal computers in each subscriber's home, the other optical signal (wavelength: 1.55 µm) is branched by the star coupler 32, and transmitted to TV receivers in each subscriber's home. An optical signal (wavelength: 1.33 µm) transmitted from a personal computer in each subscriber's home is received by the data transmitter $11_n$ through the star coupler 31 in the optical receiver 40, the optical multiplexer/demultiplexer 50 and the optical multiplexer/demultiplexer 13 in the station 10.

Preferred embodiments of the present invention have been described above. As demonstrated in the descriptions of these embodiments, the optical multiplexer/demultiplexer in accordance with the present invention is capable of reducing the loss and has superior characteristics.

What is claimed is:

1. An optical multiplexer/demultiplexer comprising:
a first member on which a first optical waveguide and a second optical waveguide are formed so as to reach to an end face of the first member; a second member on which a third optical waveguide is formed so as to reach to an end face of the second member; and an optical filter provided between the end face of the first member and the end face of the second member, wherein
the optical filter allows, among light components included in light transmitted through the first optical waveguide and outputted from the end face of the first member, a light component, which has been transmitted by the optical filter, to enter into the third optical waveguide from the end face of the second member, and a light component which has been reflected by the optical filter to enter into the second optical waveguide from the end face of the first member, or
the optical filter allows, among light components included in light transmitted through the third optical waveguide and outputted from the end face of the second member, a light component, which has been transmitted by the optical filter, to enter into the first optical waveguide from the end face of the first member, and among light components included in light transmitted through the second optical waveguide and outputted from the end face of the first member, a light component which has been reflected by the optical filter to enter into the first optical waveguide from the end face of the first member, wherein
the optical axis of the first optical waveguide at the end face of the first member and the optical axis of the third optical waveguide at the end face of the second member are parallel to each other but do not reside on an identical straight line.

2. The optical multiplexer/demultiplexer according to claim 1, wherein the first member is a planar waveguide.

3. The optical multiplexer/demultiplexer according to claim 1, wherein the second member is a planar waveguide.

4. The optical multiplexer/demultiplexer according to claim 1, wherein the second member is an optical fiber or an optical fiber array.

5. The optical multiplexer/demultiplexer according to claims 2, wherein the mode field diameter of the planar waveguide is enlarged at the end face.

6. The optical multiplexer/demultiplexer according to claims 3, wherein the mode field diameter of the planar waveguide is enlarged at the end face.

7. The optical multiplexer/demultiplexer according to claim 4, wherein the mode field diameter of the optical fiber or each optical fiber included in the optical fiber array is enlarged at the end face.

8. The optical multiplexer/demultiplexer according to claim 1, wherein the optical filter is a dielectric multilayered filter.

9. The optical multiplexer/demultiplexer according to claim 1, wherein the optical filter is formed being deposited on the end face of the first member or the end face of the second member.

10. The optical multiplexer/demultiplexer according to claim 1, wherein the optical filter is fixed to the end face of the first member or the end face of the second member with an adhesive.

11. The optical multiplexer/demultiplexer according to claim 1, wherein a plurality of sets each of which includes the first optical waveguide, the second optical waveguide, the third optical waveguide and the optical filter is provided.

12. The optical multiplexer/demultiplexer according to claim 11, wherein optical waveguides included in the same side with respect to the optical filter are formed on a common member.

13. The optical multiplexer/demultiplexer according to claim 11, wherein the optical filters are formed integrally for the plurality of sets.

14. The optical multiplexer/demultiplexer according to claim 11, wherein the optical axes of the optical waveguides residing at the same side with respect to the optical filter are parallel to each other in the vicinity of the end face of the member different from the end face of the member opposite to the optical filter.

15. The optical multiplexer/demultiplexer according to claim 1, wherein the first optical waveguide or the second optical waveguide is formed to be straight in the first member.

16. The optical multiplexer/demultiplexer according to claim 15, wherein the plan shape of the first member is a rectangular shape having a first edge facing to the optical filter, a second edge at the side opposite to the first edge, and mutually parallel third and fourth edges, and
to the optical waveguide formed straightly out of the first optical waveguide and the second optical waveguide, the third edge and the fourth edge are parallel and the second edge is perpendicular.

17. The optical multiplexer/demultiplexer according to claim 15, wherein the plan shape of the first member is a rectangular shape having a first edge facing to the optical filter, a second edge on the side opposite to the first edge, and mutually parallel third and fourth edges,
the third edge and the fourth edge are parallel to the optical waveguide formed straightly out of the first optical waveguide and the second optical waveguide, and the second edge is parallel to the first edge.

18. The optical multiplexer/demultiplexer according to claim 1, wherein each of the end faces of the first member and the second member is a polished face.

19. The optical multiplexer/demultiplexer according to claim 18, wherein each of the end faces of the first member and the second member is perpendicular to a face including the first waveguide, the second waveguide and the third waveguide.

20. The optical multiplexer/demultiplexer according to claim 19, wherein each of the end faces of the first member and the second member is perpendicular to a bisecting line of an angle formed by the first waveguide and the second waveguide.

21. The optical multiplexer/demultiplexer according to claim 1, wherein each of the end faces of the first member and the second member is in a close contact with the optical filter.

22. An optical communication system for transmitting optical signals including a plurality of wavelengths, comprising an optical multiplexer/demultiplexer defined in claim 1, wherein the optical signals are multiplexed or demultiplexed by the optical multiplexer/demultiplexer.

23. An optical communication system for transmitting optical signals including a plurality of wavelengths, comprising an optical multiplexer/demultiplexer defined in claim 15, wherein an optical signal of a first wavelength among the optical signals is guided in one optical waveguide formed straightly out of the first optical waveguide and the second optical waveguide, and an optical signal of a second wavelength shorter than the first wavelength in the plurality of wavelengths is guided in the other optical waveguide.

24. The optical multiplexer/demultiplexer according to claim 1, wherein, a distance between the end face of the first member and the optical filter is three micrometers or less, and a distance between the end face of the second member and the optical filter is three micrometers or less.

* * * * *